United States Patent
Rhee et al.

(10) Patent No.: US 12,283,673 B2
(45) Date of Patent: Apr. 22, 2025

(54) BATTERY MODULE AND BATTERY PACK

(71) Applicant: SK On Co., Ltd., Seoul (KR)

(72) Inventors: Seo Roh Rhee, Daejeon (KR); Tae Il Kim, Daejeon (KR); Ju Young Jeong, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/096,016

(22) Filed: Jan. 12, 2023

(65) Prior Publication Data

US 2023/0268581 A1 Aug. 24, 2023

(30) Foreign Application Priority Data

Jan. 14, 2022 (KR) ........................ 10-2022-0006137

(51) Int. Cl.
*H01M 10/653* (2014.01)
*H01M 10/658* (2014.01)
*H01M 50/204* (2021.01)
*H01M 50/289* (2021.01)

(52) U.S. Cl.
CPC ....... *H01M 10/653* (2015.04); *H01M 10/658* (2015.04); *H01M 50/204* (2021.01); *H01M 50/289* (2021.01)

(58) Field of Classification Search
CPC .......................... H01M 10/653; H01M 10/658
See application file for complete search history.

(56) References Cited

U.S. PATENT DOCUMENTS

| | | | |
|---|---|---|---|
| 2018/0183119 A1* | 6/2018 | Ju | H01M 50/224 |
| 2021/0028517 A1* | 1/2021 | Choi | H01M 10/613 |
| 2021/0074960 A1 | 3/2021 | Stude et al. | |
| 2021/0184303 A1 | 6/2021 | Lee et al. | |
| 2021/0257690 A1 | 8/2021 | Kilhenny et al. | |
| 2022/0037714 A1 | 2/2022 | Lee | |
| 2022/0173454 A1 | 6/2022 | Kogami et al. | |
| 2022/0181716 A1 | 6/2022 | Katayama et al. | |

FOREIGN PATENT DOCUMENTS

| | | |
|---|---|---|
| CN | 113614986 A | 11/2021 |
| EP | 4019094 A1 | 6/2022 |
| JP | 2021005508 A | 1/2021 |
| JP | 2021507483 A | 2/2021 |
| JP | 2021-144879 A | 9/2021 |

(Continued)

OTHER PUBLICATIONS

Extended European Search Report for the European Patent Application No. 23151537.0 issued by the European Patent Office on Jun. 12, 2023.

(Continued)

*Primary Examiner* — Karie O'Neill Apicella
(74) *Attorney, Agent, or Firm* — IP & T GROUP LLP (57) ABSTRACT

A battery module includes a housing having an internal space, a cell stack disposed in the internal space and including a plurality of battery cells and one or more thermal barrier assemblies, and an adhesive member disposed between the cell stack and the housing, wherein at least a portion of the adhesive member fills a gap between at least one edge of the thermal barrier assembly and the housing, and the at least one edge of the thermal barrier assembly is coupled to the housing by the adhesive member.

19 Claims, 9 Drawing Sheets

(56) References Cited

FOREIGN PATENT DOCUMENTS

| KR | 10-2020-0106378 A | 9/2020 |
|---|---|---|
| KR | 10-2021-0055364 A | 5/2021 |
| KR | 10-2021-0077415 A | 6/2021 |
| WO | 2021/149903 A1 | 7/2021 |
| WO | 2021/221300 A1 | 11/2021 |

OTHER PUBLICATIONS

Office Action for the Korean Patent Application No. 10-2022-0006137 issued by the Korean Intellectual Property Office on Mar. 21, 2023.
Prior Art Search Report for Accelerated Examination Request for the Korean Patent Application No. 10-2022-0006137 conducted on Feb. 24, 2023.
Prior Art Search Report for Accelerated Examination Request for the Korean Patent Application No. 10-2022-0006137.

* cited by examiner

BATTERY MODULE AND BATTERY PACK

CROSS-REFERENCE TO RELATED APPLICATION(S)

This application claims benefit of priority to Korean Patent Application No. 10-2022-0006137 filed on Jan. 14, 2022 in the Korean Intellectual Property Office, the disclosure of which is incorporated herein by reference in its entirety.

BACKGROUND

1. Field

The present disclosure relates to a battery modules and a battery pack including one or more battery cells.

2. Description of Related Art

As technological development of and demand for mobile devices, electric vehicles, energy storage systems (ESSs), and the like have increased, demand for secondary batteries as an energy source has rapidly increased, Secondary batteries, in which mutual conversion between chemical energy and electrical energy is reversible, may be charged and discharged repeatedly, and types of secondary batteries that are currently widely used include lithium ion batteries, lithium polymer batteries, nickel cadmium batteries, nickel hydride batteries, nickel zinc batteries, and the like.

When an output voltage and energy capacity higher than that of one unit secondary battery cell (i.e., battery cell) are required, a battery module or battery pack may be configured by connecting a plurality of unit secondary battery cells. For example, a battery module or battery pack may refer to a device in which a plurality of unit secondary battery cells are connected in series or parallel to store or output electrical energy.

In a battery module or battery pack including a plurality of battery cells or battery modules, if a specific battery cell fails, gas or conductive particles may be ejected into the module or pack, which may affect other battery cells or battery modules to cause chain thermal runaway. When a battery pack is mounted in a vehicle, thermal runaway of the battery pack may threaten the life of a driver or passenger, so it is necessary to prevent or delay chain thermal runaway.

To this end, in the battery module according to the related art, a heat-resistant sheet or pad is disposed between battery cells. Such a sheet or pad may have an effect of somewhat delaying transfer of thermal runaway that occurs in one battery cell to another battery cell beyond a barrier. However, the sheet or pad of the related art is difficult to closely couple to a housing. In this case, an empty space may be formed between the sheet or pad and the housing, or the edge of the sheet or pad may be temporarily or repeatedly separated from the housing due to pressure inside the module. Accordingly, when thermal runaway of the battery cell continues, there is a risk that conductive particles due to flames or explosion may pass over the sheet or pad or penetrate into the space between the sheet or pad and the housing to be transferred to another battery cell.

SUMMARY

Exemplary embodiments provide a battery module and battery pack with high safety.

Exemplary embodiments also provide a battery module and a battery pack capable of preventing thermal energy, flames, or conductive particles occurring due to thermal runaway or ignition of a specific battery cell from transferring to other adjacent battery cells.

Exemplary embodiments also provide a battery module and battery pack capable of suppressing the occurrence of chain thermal runaway.

According to an aspect of the present disclosure, a battery module includes: a housing having an internal space; a cell stack disposed in the internal space and including a plurality of battery cells and one or more thermal barrier assemblies; and an adhesive member disposed between the cell stack and the housing, wherein at least a portion of the adhesive member fills a gap between at least one edge of the thermal barrier assembly and the housing, and the at least one edge of the thermal barrier assembly is coupled to the housing by the adhesive member.

The adhesive member may include a thermally conductive adhesive and may fix at least one edge of the thermal barrier assembly to the housing.

At least one of the one or more thermal barrier assemblies may include a heat-resistant member preventing heat propagation between adjacent battery cells; and a compression member facing the heat-resistant member, wherein at least one edge of the heat-resistant member is inserted into the housing.

The heat-resistant member may include mica, ceramic wool, or aerogel, or a combination of two or more of mica, ceramic wool, and aerogel.

One surface of the compression member faces one surface of the heat-resistant member, and an area of the one surface of the compression member may be smaller than or equal to an area of the one surface of the heat-resistant member.

One or more compression members may be disposed on the one surface and the other side opposite to the one surface of the heat-resistant member, respectively.

The thermal barrier assembly may further include a fixing member disposed on at least one side of the compression member.

The heat-resistant member and the compression member may be fixed to each other via the fixing member.

At least one of the plurality of battery cells and the thermal barrier assembly may be fixed to each other via the fixing member.

The housing may include a first cover facing one surface of the cell stack and a second cover facing the other surface of the cell stack, and the adhesive member may include a first adhesive member disposed between the cell stack and the first cover and a second adhesive member disposed between the cell stack and the second cover.

An area in which the second adhesive member contacts the second cover may be larger than an area in which the first adhesive member contacts the first cover.

The second adhesive member may continuously contact the second cover in a first direction, which is a stacking direction of the cell stack.

The heat-resistant member may include a protrusion protruding more in a second direction than the plurality of battery cells, and the second direction may be a direction in which the first cover and the second cover face each other.

At least one of the first cover and the second cover may include a groove in which at least a portion of the protrusion is accommodated. In this case, an end portion of the protrusion and the groove may be spaced apart from each other in the second direction, and at least a portion of the adhesive member may fill a gap between the end portion of the protrusion and the groove.

According to another aspect of the present disclosure, a battery module includes: a housing including an upper cover and a lower cover; a thermal barrier assembly inserted into at least one of the upper cover and the lower cover to partition an internal space of the housing; a plurality of battery cells disposed in the internal space; and an adhesive member disposed between the thermal barrier assembly and the housing, wherein a space is disposed between the thermal barrier assembly and at least one of the upper cover and the lower cover, and the adhesive member fills the space.

At least one of the upper cover and the lower cover may further include a groove into which at least a portion of the thermal barrier assembly is inserted, and the adhesive member may extend along the groove.

The adhesive member may include a thermally conductive adhesive and may fix the thermal barrier assembly to the groove.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Prior to the description of the present disclosure, terms and words used in the present specification and claims to be described below should not be construed as being limited to ordinary or dictionary terms, and should be construed in accordance with the technical idea of the present disclosure based on the principle that the inventors may properly define their own inventions in terms of terms in order to best explain the invention. Therefore, the exemplary embodiments described in the present specification and the configurations illustrated in the drawings are merely the most preferred exemplary embodiments of the present disclosure and are not intended to represent all of the technical ideas of the present disclosure, and thus should be understood that various equivalents and modifications may be substituted at the time of the present application.

Hereinafter, preferred exemplary embodiments of the present disclosure will be described in detail with reference to the accompanying drawings. In this case, in the drawings, the same components are denoted by the same reference symbols as possible. Further, the detailed description of well-known functions and constructions which may obscure the gist of the present disclosure will be omitted. For the same reason, some of the elements in the accompanying drawings are exaggerated, omitted, or schematically illustrated, and the size of each element does not entirely reflect the actual size.

As used herein, the singular forms "a", "an," and "the" are intended to include the plural forms as well, unless the context clearly indicates otherwise, and throughout the specification, like reference numerals refer to like or corresponding elements.

In addition, in the present specification, the expressions, such as an upper side, a lower side, a side face, a rear surface, and the like, are described based on the drawings and may be expressed differently when the direction of the corresponding object is changed.

It will be understood that, although the terms first, second, etc. May be used herein to describe various elements, these elements should not be limited by these terms. These terms are only used to distinguish one element from another. For example, a first element could be termed a second element, and, similarly, a second element could be termed a first element, without departing from the scope of the present disclosure.

Figure 1:
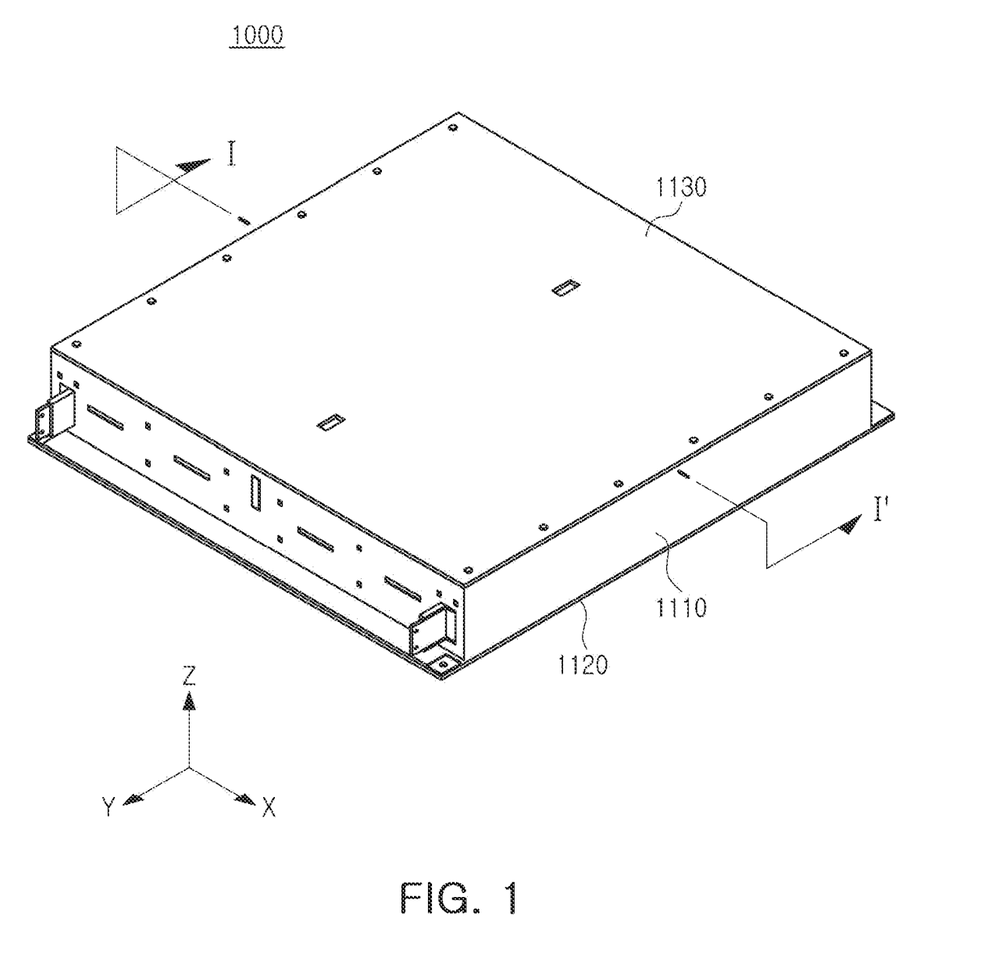
FIG. 1 is a perspective view of a battery module according to exemplary embodiments.
Figure 2:
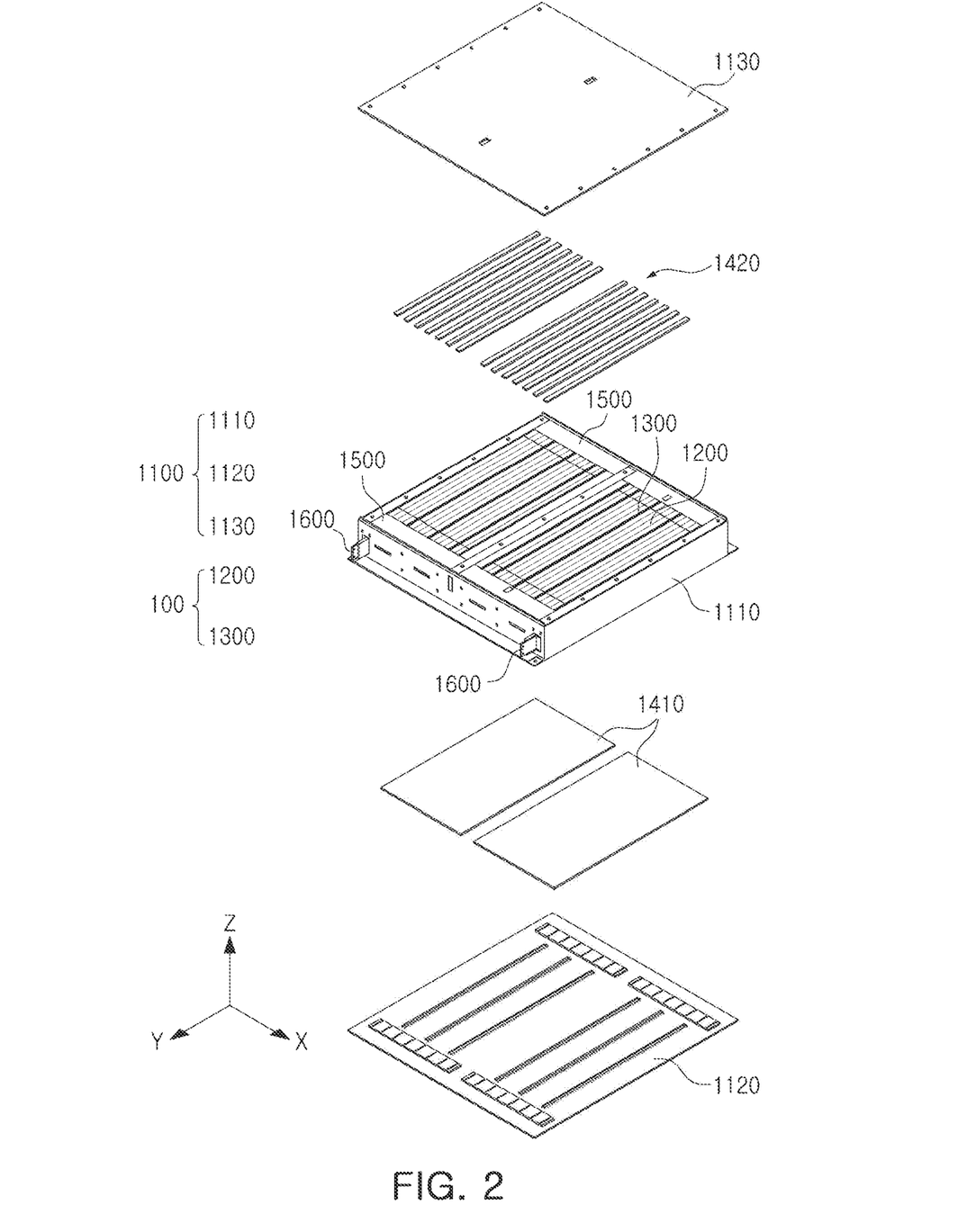
FIG. 2 is an exploded perspective view of a battery module according to exemplary embodiments.

FIG. 1 is a perspective view of a battery module 1000 according to exemplary embodiments. FIG. 2 is an exploded perspective view of the battery module 1000 according to exemplary embodiments.

In exemplary embodiments, the battery module 1000 may include a housing 1100 having an internal space and a cell stack 100 accommodated in the internal space.

The housing 1100 may accommodate one or more cell stacks 100 therein. For example, as shown in FIG. 2, the housing 1100 may include a module frame 1110 surrounding a side surface of the cell stack 100, and may include an upper cover 1130 and a lower cover 1120 disposed above and below the module frame 1110. The module frame 1110 may have a shape of a square frame with open top and bottom, and the open top and bottom may be covered with the upper cover 1130 and the lower cover 1120, respectively. However, the shape of the module frame 1110 is not limited thereto, and may be, for example, a 'U'-shaped type in which the top and front and rear are open, or an 'I'-shaped type having upper and lower plates and a central partition.

In exemplary embodiments, at least some of the module frame 1110, the upper cover 1130, and the lower cover 1120 of the housing 1100 include may a material having predetermined rigidity to protect the cell stack 100 and other internal electronic/electric components from an external shock. For example, the housing 1100 may include a metal material, such as aluminum.

In exemplary embodiments, the cell stack 100 may include one or more battery cells 1200 and one or more thermal barrier assemblies 1300. A plurality of battery cells 1200 and one or more thermal barrier assemblies 1300 may be stacked in one direction (e.g., an X-axis direction of FIG. 2) to form the cell stack 100.

The cell stack 100 may include one or more battery cells 1200 capable of storing or discharging electrical energy. In exemplary embodiments, the plurality of battery cells 1200 may be arranged and electrically connected to each other. The plurality of battery cells 1200 included in the cell stack 100 may be electrically connected to each other through a bus bar assembly 1500. For example, as shown in FIG. 2, the bus bar assemblies 1500 are disposed at one end and the other end of the cell stack 100, respectively, to electrically connect the plurality of battery cells 1200 to each other.

In exemplary embodiments, the battery module 1000 may include an electrode tab 1600 electrically connected to the cell stack 100. For example, as shown in FIG. 2, the battery module 1000 may include the electrode tab 1600 exposed to the outside from one side of the housing 1100 and electrically connected to the bus bar assembly 1500. An external electrical circuit of the battery module 1000 and the cell stack 100 may be electrically connected to each other through the electrode tab 1600.

In exemplary embodiments, one or more thermal barrier assemblies 1300 may partition the internal space of the housing 1100 into two or more sub-spaces. For example, one edge and the other edge of the thermal barrier assembly 1300 may be coupled to the upper cover 1130 and the lower cover 1120 of the housing 1100 to partition the internal space.

When the thermal barrier assembly is coupled to the housing, a gap may be formed at a junction between the thermal barrier assembly and the housing. For example, a space may occur between the thermal barrier assembly and the housing due to manufacturing tolerance, and a gap may be created due to the space.

In order to completely fill the gap, in some exemplary embodiments, the battery module 1000 may include adhesive members 1410 and 1420 disposed between the cell stack 100 and the housing 1100. For example, as shown in FIG. 2, an upper adhesive member 1420 may be disposed between the cell stack 100 and the upper cover 1130, and a lower adhesive member 1410 may be disposed between the cell stack 100 and the lower cover 1120. In exemplary embodiments, both the upper adhesive member 1420 and the lower adhesive member 1410 may be disposed in the battery module 1000 or only one of them may be disposed.

The adhesive members 1410 and 1420 may fill at least a portion of the gap between the cell stack 100 and the housing 1100. For example, at least a portion of the upper adhesive member 1420 may fill a gap between the thermal barrier assembly 1300 and the upper cover 1130 compactly, and at least a portion of the lower adhesive member 1410 may fill the gap between the thermal barrier assembly 1300 1300 and the lower cover 1120 compactly.

In exemplary embodiments, at least some of the adhesive members 1410 and 1420 may continuously extend along the edge of the thermal barrier assembly 1300. For example, at least a portion of the upper adhesive member 1420 and the lower adhesive member 1410 may continuously contact the edge of the thermal barrier assembly 1300 to seal the gap between the thermal barrier assembly 1300 and the housing 1100. Accordingly, the internal space of the housing 1100 may be divided into at least two sub-spaces separated from each other based on the thermal barrier assembly 1300.

In exemplary embodiments, at least a portion of the adhesive members 1410 and 1420 may continuously extend in a length direction (e.g., a Y-axis direction of FIG. 2) of the thermal barrier assembly 1300. For example, the upper adhesive member 1420 and the lower adhesive member 1410 may each extend in the length direction (the Y-axis direction in FIG. 2) to fill a gap between the thermal barrier assembly 1300 and the upper cover 1130 and between the thermal barrier assembly 1300 and the lower cover 1120.

In exemplary embodiments, the adhesive members 1410 and 1420 may include a thermally conductive material capable of transferring heat from the cell stack 100 to the housing 1100. For example, the adhesive member may include at least one of a thermally conductive resin or a thermally conductive adhesive. Here, the thermally conductive resin may include at least one of a silicone material, an urethane material, an epoxy resin, a modified silane, a rubber material, a polyester material, and an acrylic material. Alternatively, the adhesive member is a thermally conductive adhesive and may include a material having a thermal conductivity of 1.1 W/mk to 2.1 W/mk. Alternatively, the adhesive members 1410 and 1420 are thermally conductive adhesives, and may include a material having a residual amount of 50% or more in a thermogravimetric analysis (TGA) test heated from room temperature (RT) to 1000 degrees Celsius at 20 degrees Celsius per minute. As described above, the adhesive members 1410 and 1420 may include a thermally conductive material to transfer heat generated in the cell stack 100 to the housing 1100 and release heat externally to prevent overheating of the cell stack 100.

In exemplary embodiments, the adhesive members 1410 and 1420 may include a thermally conductive adhesive, and thus, the thermal barrier assembly 1300, the battery cell 1200, and the housing 1100 may be firmly fixed to each other. In particular, the adhesive member disposed at the junction between the thermal barrier assembly and the housing may serve to fill a gap between the thermal barrier assembly and the housing compactly and to firmly fix them to each other.

In exemplary embodiments, the adhesive members 1410 and 1420 may be applied to contact at least a portion of the cell stack 100 during the manufacturing process of the battery module 1000. For example, in a stage before the cell stack 100 is seated on the lower cover 1120, the lower adhesive member 1410 may be applied to at least one of the lower cover 1120 or the cell stack 100. In addition, in a stage before mounting the upper cover 1130 on the top of the cell stack 100, the upper adhesive member 1420 may be applied to at least one of the upper cover 1130 or the cell stack 100. However, an application process of the adhesive members 1410 and 1420 is not limited thereto. For example, the adhesive members 1410 and 1420 may be applied simultaneously when the cell stack 100 and the housing 1100 are assembled, or in a stage after disposing the cell stack 100 in the housing 1100, the adhesive members 1410 and 1420 may be injected into the housing 1100 through an injection hole (not shown) provided in the housing 1100.

In exemplary embodiments, the lower adhesive member 1410 may be applied over a wider area than that of the upper adhesive member 1420. For example, as shown in FIG. 2, the upper adhesive member 1420 may be partially applied to an upper portion of the cell stack 100, and the lower adhesive member 1410 may be applied to a lower portion of the cell stack 100 over a wider area than that of the upper adhesive member 1420. In exemplary embodiments, the lower adhesive member 1410 may be continuously applied in a stacking direction of the cell stack 100 and may be applied to cover the entire region of the lower cover 1120 facing the cell stack 100. Accordingly, an area in which the lower adhesive member 1410 contacts the lower cover 1120 may be larger than an area in which the upper adhesive member 1420 contacts the upper cover 1130. As the adhesive members 1410 and 1420 having thermal conductivity are applied more widely below the cell stack 100, a large amount of thermal energy may be discharged in a downward direction of the cell stack 100.

In exemplary embodiments, a heat sink (not shown) may be disposed on the opposite side of the surface of the lower cover 1120 facing the cell stack 100, thereby further increasing a heat dissipation effect. However, the position of the heat sink (not shown) is not limited thereto. For example, the heat sink (not shown) may be disposed inside the lower cover 1120 and integrally formed with the lower cover 1120. Alternatively, the heat sink (not shown) may be disposed on the upper cover 1130 or the module frame 1110.

In exemplary embodiments, the adhesive members 1410 and 1420 may be in a liquid state at the time of application, and thus, the adhesive members 1410 and 1420 may fill the gap between the cell stack 100 and the housing 1100 compactly even if a shape of the gap is complicated, it may be filled. In addition, since the shape of the liquid adhesive members 1410 and 1420 is deformed to correspond to the shape of the cell stack 100, at least a portion of the battery cell 1200 and the thermal barrier assembly 1300 may be in close contact with the adhesive members 1410 and 1420. The liquid adhesive member may then be solidified to firmly fix the cell stack 100, particularly, the thermal barrier assembly 1300 to the housing 1100. In addition, the solidified adhesive members 1410 and 1420 may come into surface contact with the cell stack 100 so that heat dissipation through conduction may be effectively achieved. In particular, the adhesive members 1410 and 1420 disposed in the gap between the thermal barrier assembly 1300 and the housing 1100 may quickly dissipate heat from the thermal barrier assembly 1300, and may seal a gap between the thermal barrier assembly 1300 and the housing 1100 compactly. Accordingly, the thermal barrier assembly 1300 and the adhesive members 1410 and 1420 in contact therewith may completely divide the internal space of the housing 1100 into two or more sub-spaces.

Hereinafter, the cell stack 100 included in the battery module 1000 will be described in detail with reference to FIGS. 3 and 4.

Figure 3:
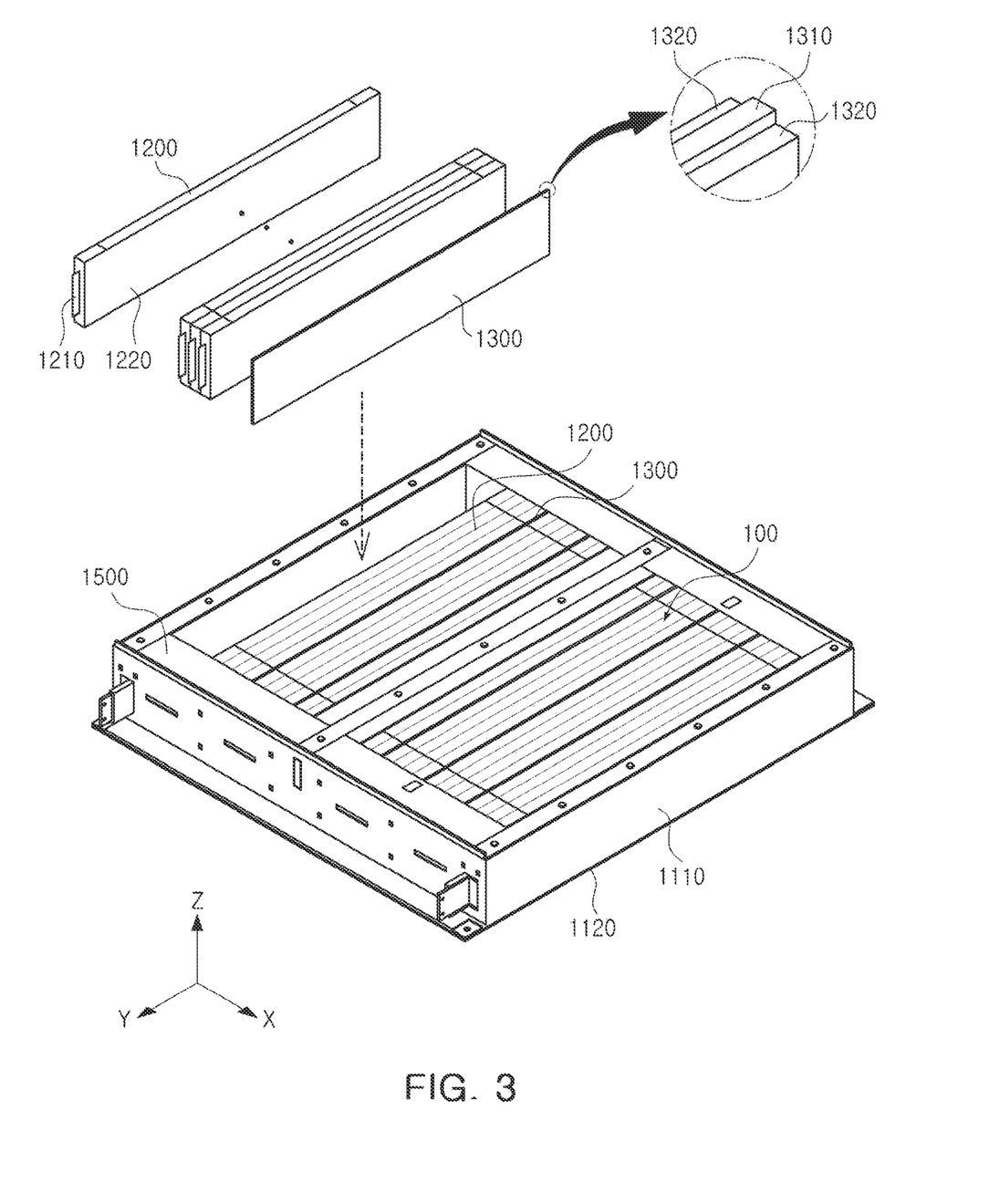
FIG. 3 is a view illustrating a configuration of a cell stack included in a battery module according to exemplary embodiments.

FIG. 3 is a view illustrating a configuration of the cell stack 100 included in a battery module 1000 according to exemplary embodiments. FIG. 4 is a view illustrating coupling of the cell stack 100 included in the battery module 1000 according to the exemplary embodiments, Since the cell stack 100 and the battery module 1000 described with reference to FIGS. 3 and 4 include all the features of the cell stack 100 and the battery module 1000 described above with reference to FIGS. 1 and 2, redundant descriptions are omitted.

In exemplary embodiments, the cell stack 100 may include one or more battery cells 1200 and one or more thermal barrier assemblies 1300. For example, as shown in FIG. 3, the plurality of battery cells 1200 and the thermal barrier assembly 1300 may be stacked in one direction (the X-axis direction in FIG. 3) to form the cell stack 100.

In exemplary embodiments, cell stack 100 may include one or more battery cells 1200, The battery cell 1200 may be configured to convert chemical energy into electrical energy to supply power to an external circuit or to receive power supplied from the outside and convert electrical energy into chemical energy to store electricity. For example, the battery cell 1200 may include a nickel metal hydride (Ni-MH) battery or a lithium ion (Li-ion) battery that may be charged or discharged, but is not limited thereto. In exemplary embodiments, the plurality of battery cells 1200 may be stacked side by side and connected in series or parallel to each other through a bus bar assembly 1500.

In exemplary embodiments, the plurality of battery cells 1200 included in the cell stack 100 may be pouch-type battery cells. The pouch-type battery cell 1200 may include a main chamber 1220 in which an electrode assembly (not shown) is accommodated in a pouch and a plurality of lead tabs 1210 electrically connected to the electrode assembly (not shown) and exposed to the outside of the pouch.

However, the battery cell 1200 is not limited to the pouch type, and may be configured as a can-type battery cell. For example, the can-type battery cells may have a square plane to be stacked to form the cell stack 100. In the can-type battery cell having a square plane, each lead tab may be located at both end portions of the battery cell 1200 and connected to the bus bar assembly 1500.

In exemplary embodiments, the thermal barrier assembly 1300 may include a heat-resistant member 1310 preventing heat propagation between adjacent battery cells 1200, a compression member 1320 compressing the battery cell 1200, and a fixing member 1330 fixing the heat-resistant member 1310 and the compression member 1320 to each other. For example, as shown in FIG. 4, the heat-resistant member 1310, the compression member 1320, and the fixing member 1330 may be stacked side by side in a stack direction (e.g., in the X-axis direction of FIG. 4) of the battery cell 1200 to form the thermal barrier assembly 1300.

In exemplary embodiments, the cell stack 100 may include a plurality of thermal barrier assemblies 1300. The plurality of thermal barrier assemblies 1300 may be arranged side by side with a predetermined interval in the stacking direction (the X-axis direction in FIG. 3) of the cell stack 100, and one or more battery cells 1200 may be disposed between two thermal barrier assemblies 1300 adjacent to each other. For example, as shown in FIG. 3, a plurality of battery cells 1200 may be stacked and disposed between any one thermal barrier assembly 1300 and another thermal barrier assembly 1300 adjacent thereto. In the drawing, it is illustrated that four battery cells 1200 are stacked between the two thermal barrier assemblies 1300, but this is only an example, and three or less or five or more battery cells 1200 may be disposed between the two thermal barrier assemblies 1300.

In exemplary embodiments, one or more heat-resistant members 1310 may be disposed in one thermal barrier assembly 1300 to prevent heat propagation between adjacent battery cells 1200.

In exemplary embodiments, the heat-resistant member 1310 may include a material having at least one of flame retardancy, heat resistance, heat insulation, and insulating properties. Here, heat resistance may refer to properties that does not melt and does not change in shape even at a temperature of 300 degrees Celsius or higher, and heat insulation may refer to properties that have a thermal conductivity of 1.0 W/mk or less. For example, the heat-resistant member 1310 may include at least some of a mica sheet, silicate, graphite, alumina, ceramic wool or super wool, and aerogel capable of preventing heat and/or flame propagation. However, the material of the heat-resistant member 1310 is not limited thereto and the heat-resistant member 1310 may be formed of any material that may maintain its shape in a thermal runaway situation of the battery cell 1200 and prevent heat or flames from propagating to other adjacent battery cells 1200.

In order to maximize energy density of the cell stack 100, a thickness of the heat-resistant member 1310 may be smaller than that of the battery cell 1200. Here, the thickness may refer to a length of the cell stack 100 in the stacking direction. In exemplary embodiments, the thickness of the heat-resistant member 1310 may range from 0.5 T to 3.0 T.

In exemplary embodiments, one or more compression members 1320 may be disposed in one thermal barrier assembly 1300. The compression member 1320 may press the battery cell 1200 with a predetermined elastic force, thereby preventing the battery cell 1200 from swelling. For example, the compression member 1320 may include at least one of polyurethane, silicone, and rubber (EPDM), and may press the main surface 1220 of the battery cell 1200 using elasticity of these materials.

In exemplary embodiments, the compression member 1320 may be disposed such that one surface faces the battery cell 1200 and the other surface opposite to the one surface faces the heat-resistant member 1310. An area of one surface of the compression member 1320 may be equal to or greater than an area of the main chamber 1220 of the battery cell 1200 facing the compression member 1320. Accordingly, all regions of the main chamber 1220 of the battery cell 1200 may face one surface of the compression member 1320 and be pressed by the compression member 1320. Accordingly, the compression member 1320 may effectively absorb and buffer expansion pressure caused by the swelling of the battery cell 1200.

In exemplary embodiments, one or more compression members 1320 may be disposed on different sides of the heat-resistant member 1310, respectively. For example, as shown in FIG. 4, the thermal barrier assembly 1300 may include compression members 1320 disposed on both sides of the heat-resistant member 1310 based on the heat-resistant member 1310.

Figure 4:
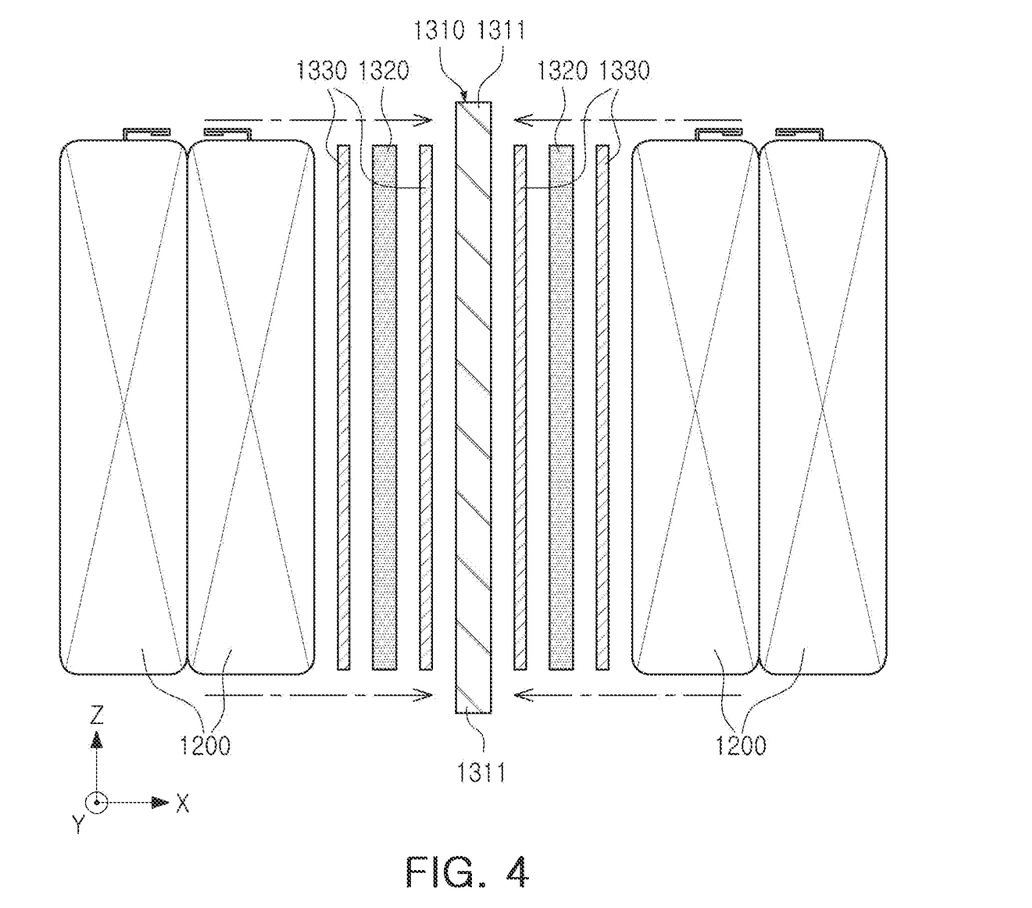
FIG. 4 is a view illustrating coupling of cell stacks included in a battery module according to exemplary embodiments.

In exemplary embodiments, the thermal barrier assembly 1300 may further include the fixing member 1330 disposed on at least one side of the compression member 1320, For example, as shown in FIG. 4, the fixing member 1330 may be disposed between the heat-resistant member 1310 and the compression member 1320 and between the battery cell 1200 and the compression member 1320. The fixing member 1330 may include a material having adhesive strength, for example, a silicone-based, acrylic-based, rubber-based, hot-melt-based, epoxy-based, pressure sensitive adhesive (PSA)-based, or urethane-based material. The fixing member 1330 may be an adhesive tape of a substrate type, an inorganic material type, or a PSA hot melt type.

In exemplary embodiments, one surface of the fixing member 1330 may be in contact with the compression member 1320, and the other surface opposite to the one surface may be in contact with the heat-resistant member 1310 or the battery cell 1200 to compress the heat-resistant member 1310 and the compression member 1320 or the heat-resistant member 1310 and the battery cell 1200 to each other. That is, the compression member 1320 and the heat-resistant member 1310 or the compression member 1320 and the battery cell 1200 may be fixed to each other via the fixing member 1330. As the fixing member 1330 is disposed in the thermal barrier assembly 1300, the thermal barrier assembly 1300 and the battery cell 1200 may be firmly fixed to each other, so that structural stability of the cell stack 100 may be improved.

In exemplary one embodiments, surface of the compression member 1320 may oppose one surface of the heat-resistant member 1310, in which case an area of one surface of the compression member 1320 may be smaller than or equal to an area of one surface of the heat-resistant member 1310. For example, when the stacking direction (the X-axis direction of FIGS. 3 and 4) of the cell stack 100 is defined as a first direction, the area of the surface of the heat-resistant member 1310, perpendicular to the first direction, may be greater than or equal to the area of the compression member 1320 facing the heat-resistant member 1310. Therefore, as shown in FIG. 4, at least a portion of the heat-resistant member 1310 may protrude further in a second direction (e.g., a Z-axis direction of FIG. 4), perpendicular to the first direction (e.g., the X-axis direction of FIG. 4) than the compression member 1320. In this case, the second direction may be a direction from the cell stack 100 toward the upper cover (e.g., 1130 of FIG. 2) or the lower cover (e.g., 1120 of FIG. 2). As described above, a portion of the heat-resistant member 1310 protruding further than the compression member 1320 in the second direction is defined as a protrusion 1311 of the heat-resistant member 1310.

In exemplary embodiments, an area of the compression member 1320 may correspond to the main chamber 1220 of the battery cell 1200, and accordingly, the area of the heat-resistant member 1310 opposing the compression member 1320 may be equal to or greater than the main chamber 1220 of the battery cell 1200. That is, a side of the heat-resistant member 1310 facing the battery cell 1200 may be wider than the main chamber 1220 of the battery cell 1200. In this case, the battery cells 1200 adjacent to each other may not directly face each other with the heat-resistant member 1310 interposed therebetween. Accordingly, in the thermal barrier assembly 1300, propagation of high-temperature thermal energy, flames, or combustion particles occurring by thermal runaway of the battery cells 1200 disposed on one side of the heat-resistant member 1310 to the battery cell 1200 disposed on the other side of the heat-resistant member 1310 may be effectively prevented.

In exemplary embodiments, in order to more effectively prevent heat propagation between the battery cells 1200, the housing (e.g., 1100 in FIG. 2) may further include a space in which at least a portion of the thermal barrier assembly 1300 is accommodated. Hereinafter, the battery module 1000 having such an accommodation structure will be described in detail with reference to FIGS. 5 to 8B.

Figure 5:
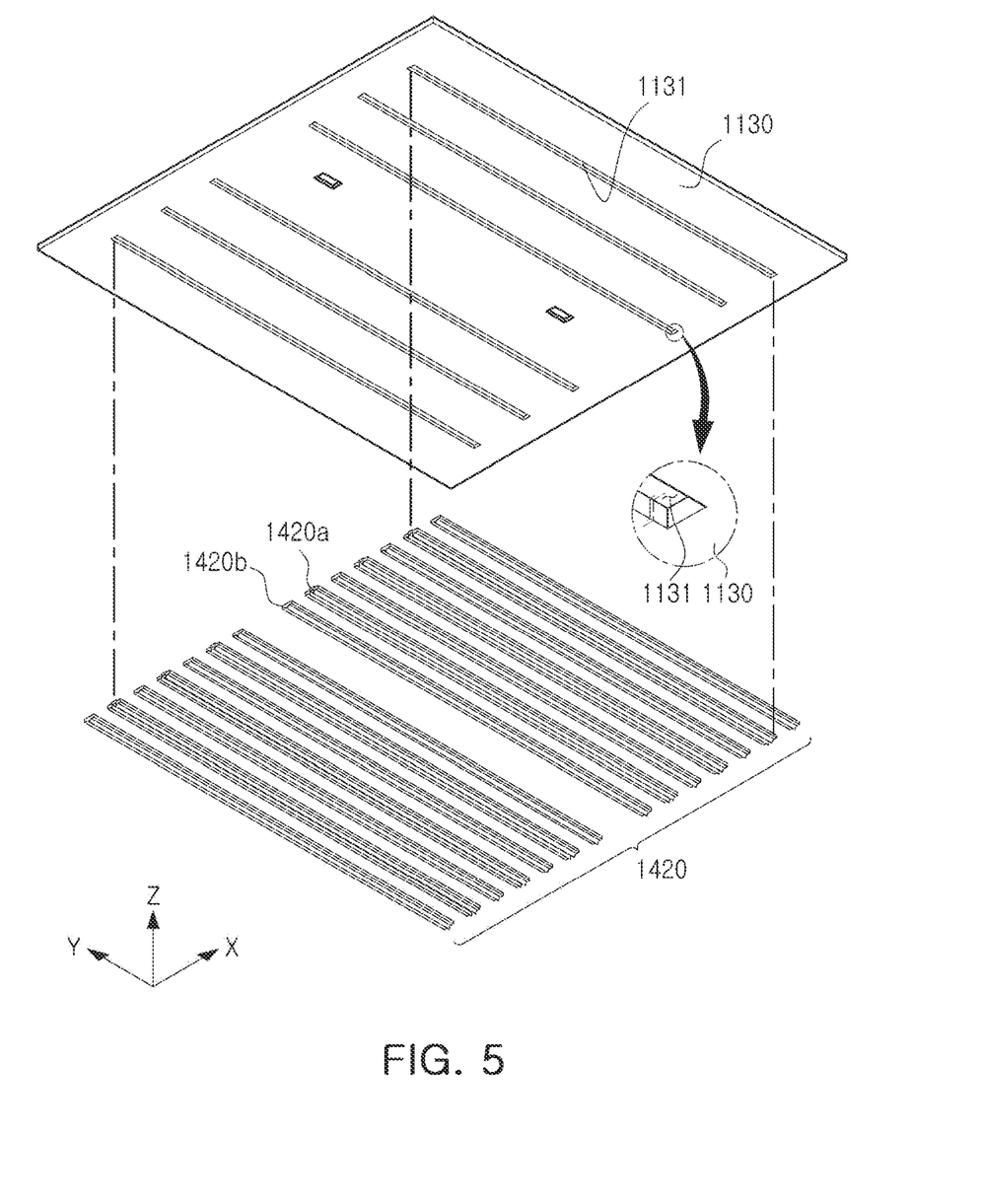
FIG. 5 is a perspective view illustrating an upper cover included in a battery module according to exemplary embodiments.
Figure 6:
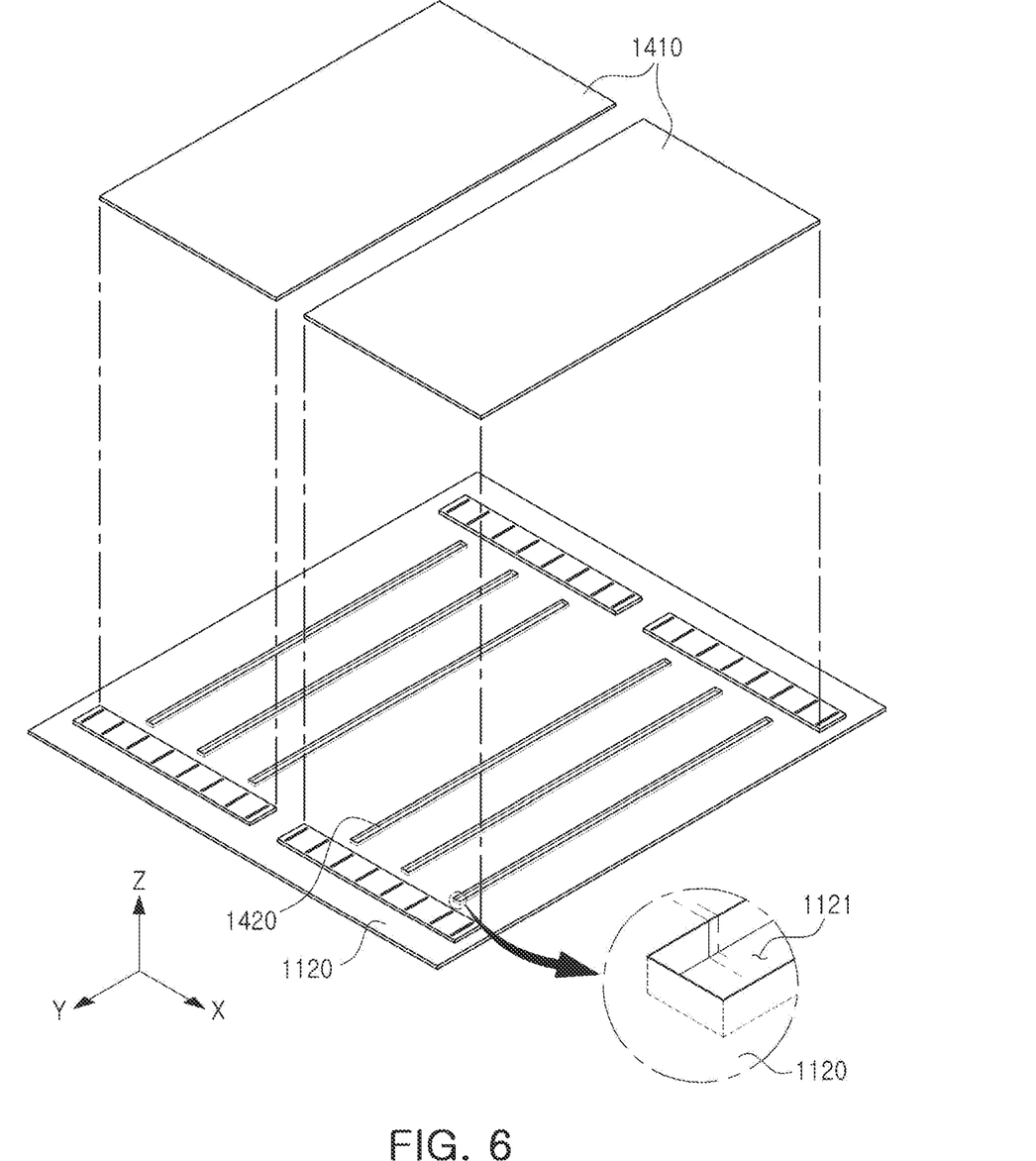
FIG. 6 is a perspective view illustrating a lower cover included in a battery module according to exemplary embodiments.
Figure 7:
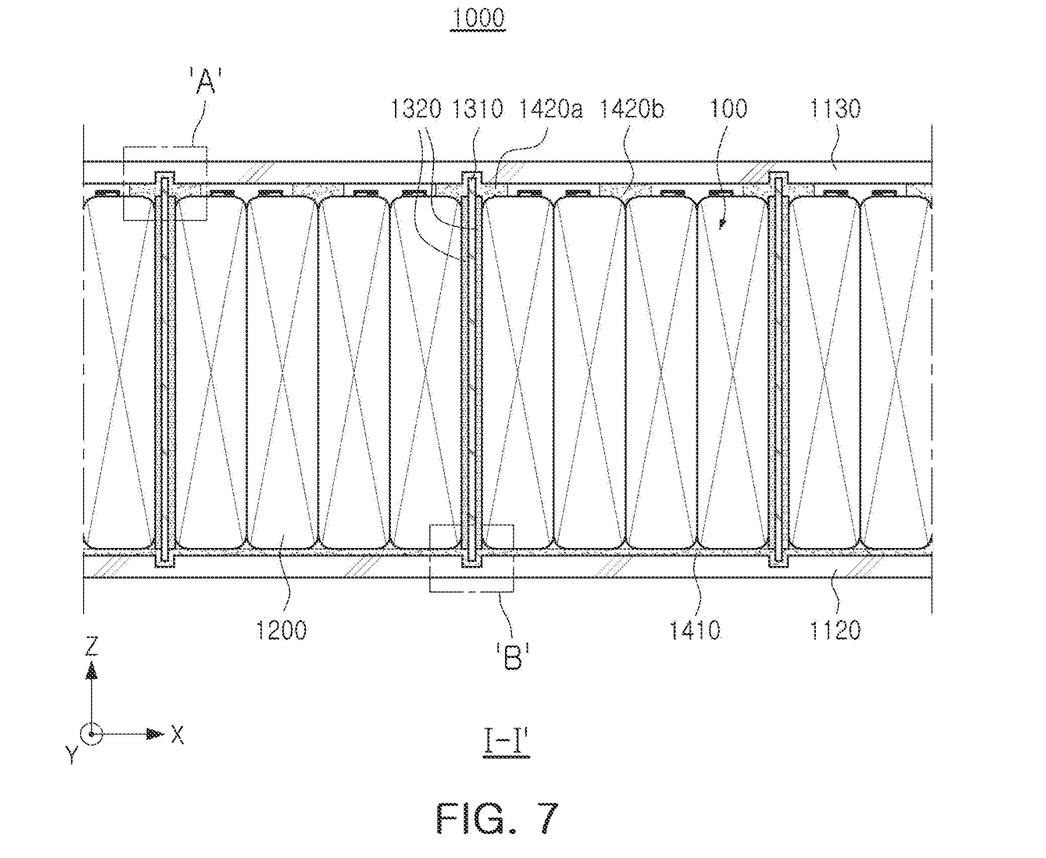
FIG. 7 is a schematic cross-sectional view taken along line I-I' of FIG. 1.
Figure 8A:
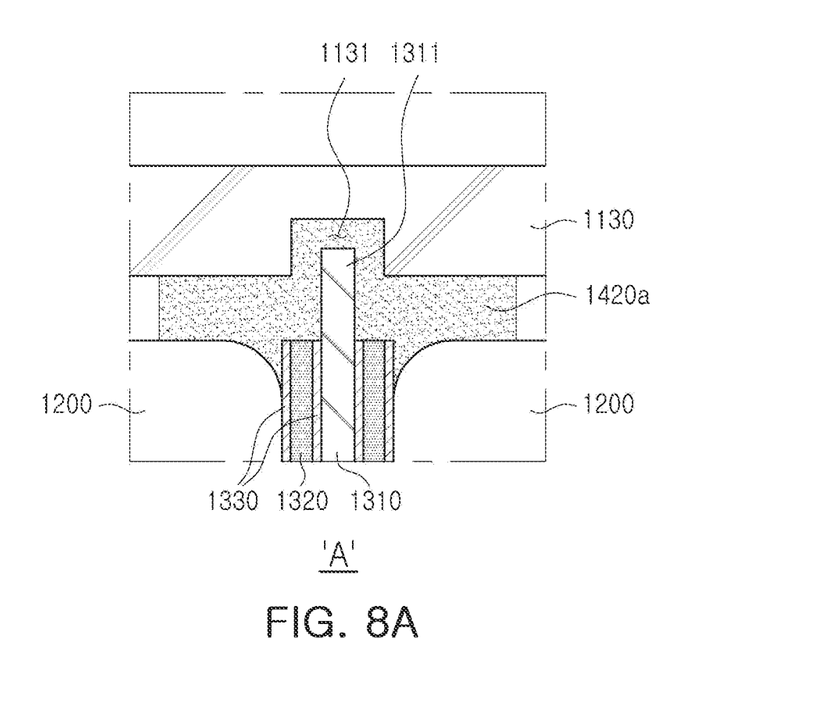
FIG. 8A is an enlarged view of portion A of FIG. 7.
Figure 8B:
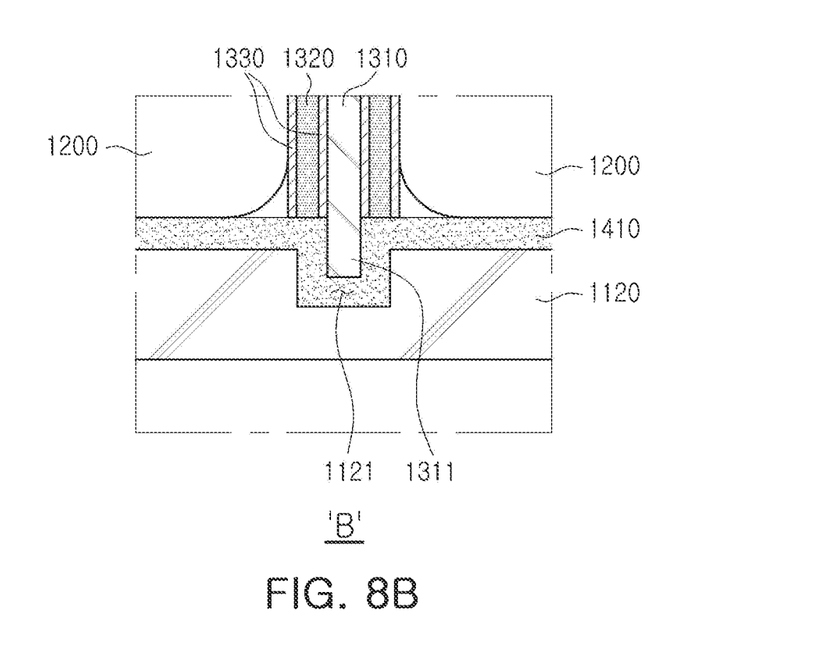
FIG. 8B is an enlarged view of portion B of FIG. 7.
Figure 9:
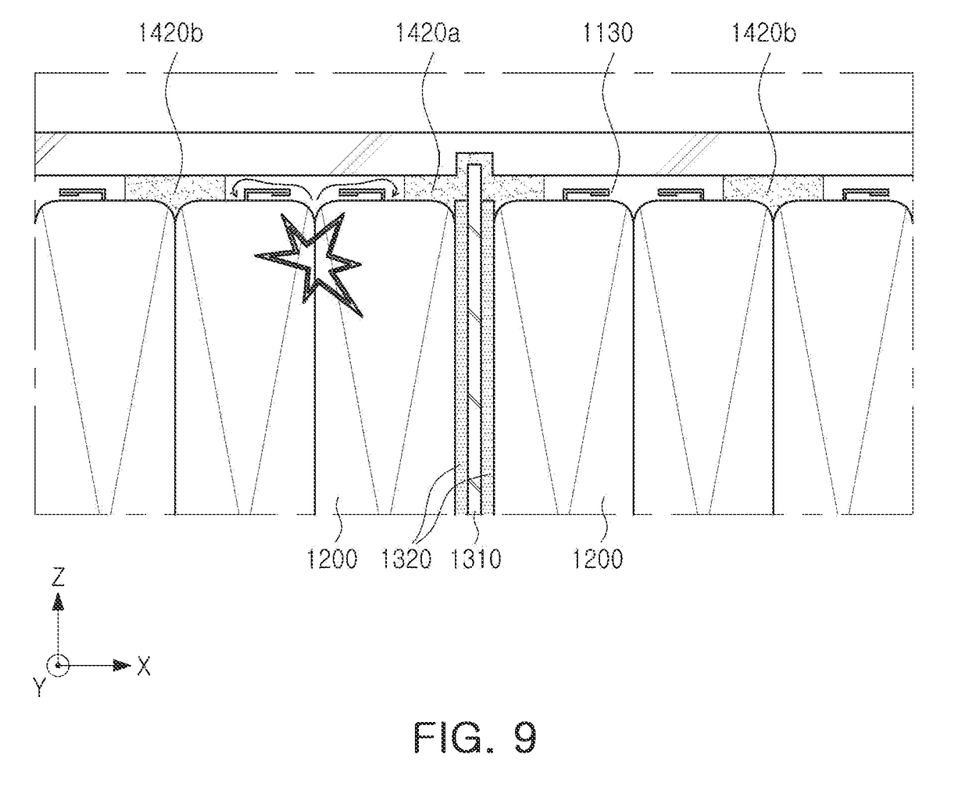
FIG. 9 is a schematic cross-sectional view taken along line I-I' of FIG. 1.

FIG. 5 is a perspective view illustrating the upper cover 1130 included in the battery module 1000 according to exemplary embodiments. FIG. 6 is a perspective view illustrating the lower cover 1120 included in the battery module 1000 according to exemplary embodiments. FIG. 7 is a schematic cross-sectional view taken along line I-I' of FIG. 1. FIG. 8A is an enlarged view of portion A of FIG. 7, and FIG. 8B is an enlarged view of portion B of FIG. 7. FIG. 9 is a schematic cross-sectional view taken along line I-I' of FIG. 1. The cell stack 100, the thermal barrier assembly 1300, the adhesive members 1410 and 1420, and the battery module 1000 described with reference to FIGS. 5 to 9 include all the characteristics of the cell stack 100, the thermal barrier assembly 1300, the adhesive members 1410 and 1420, and the battery module 1000 described above with reference to FIGS. 1 to 4, and thus, redundant descriptions are omitted.

In exemplary embodiments, the thermal barrier assembly 1300 may be a partition perpendicular to the upper cover 1130 and the lower cover 1120 and extending in a length direction (e.g., the Y-axis direction of FIG. 3) of the battery cell 1200. The internal space of the housing (e.g., 1100 in FIG. 2) may be partitioned into a plurality of sub-spaces by the thermal barrier assembly 1300. For example, as shown in FIG. 7, the internal space between the upper cover 1130 and the lower cover 1120 may be divided into several sub-spaces by a plurality of thermal barrier assemblies 1300 spaced apart at predetermined intervals.

One or more battery cells 1200 may be disposed in each sub-space. FIG. 7 shows a state in which four battery cells 1200 are stacked in one sub-space. FIG. 7 is only an example, and three or less or five or more battery cells 1200 may be disposed in one sub-space.

In the following description, a set of battery cells 1200 arranged in a sub-space is defined as a cell unit.

In exemplary embodiments, the thermal barrier assembly 1300 may include the heat-resistant member 1310 and a plurality of compression members 1320 disposed on different sides of the heat-resistant member 1310.

One surface of any one of the compression members 1320 may face the heat-resistant member 1310, and the other surface may face a cell unit disposed inside the sub-space. The compression member 1320 may press the battery cell 1200 to prevent the battery cell 1200 from swelling.

The heat-resistant member 1310 included in the thermal barrier assembly 1300 may prevent heat propagation between two neighboring cell units. For example, as shown in FIG. 7, the heat-resistant member 1310 may separate adjacent sub-spaces from each other. In order to shield adjacent cell units more reliably, a height of the heat-resistant member 1310 may be equal to or greater than an interval between the side of the upper cover 1130 facing any one battery cell 1200 and the side of the lower cover 1120 facing the battery cell 1200. Here, 'height' may refer to a length in a direction from the lower cover 1120 toward the upper cover 1130 (e.g., the Z-axis direction of FIG. 7), For example, as shown in FIG. 7, the height of the heat-resistant member 1310 may be greater than that of the adjacent compression member 1320 or cell unit. As the height of the heat-resistant member 1310 is greater than that of the cell unit, thermal energy or combustion particles resulting from ignition or explosion of one cell unit may be prevented by the heat-resistant member 1310 and may not be propagated to other neighboring cell units.

A portion of the heat-resistant member 1310 that is larger than the battery cell 1200 may be defined as the protrusion 1311 of the heat-resistant member 1310. For example, as shown in FIGS. 8A and 8B, the heat-resistant member 1310 may include the protrusion 1311 protruding more toward the upper cover 1130 or the lower cover 1120 than the battery cell 1200. At least a portion of the protrusion 1311 of the heat-resistant member 1310 may be inserted into the upper cover 1130 or the lower cover 1120. Combustion particles or flames scattered from any one battery cell 1200 may be blocked by the heat-resistant member 1300 having the protrusion 1311, and accordingly, combustion particles or flames may be prevented from propagating to other battery cells beyond the heat-resistant member 1310.

In exemplary embodiments, the fixing member 1330 may be disposed between the heat-resistant member 1310 and the compression member 1320 or between the compression member 1320 and the battery cell 1200, and the technical features of the fixing member 1330 may refer to the description of FIGS. 1 to 4.

In exemplary embodiments, the thermal barrier assembly 1300 may be inserted into grooves 1121 and 1131 disposed in the upper cover 1130 or the lower cover 1120. At least one of the upper cover 1130 and the lower cover 1120 included in the housing (e.g., 1100 in FIG. 2) may include the grooves 1121 and 1131 in which at least a portion of the thermal barrier assembly 1300 is accommodated. For example, as shown in FIG. 5, one surface of the upper cover 1130 facing the cell stack 100 may include a first groove 1131 extending in the length (e.g., the Y-axis direction in FIG. 5) of the battery cell 1200. A plurality of first grooves 1131 may be disposed on one surface of the upper cover 1130 and may be spaced apart from each other at predetermined intervals in the stacking direction (e.g., the X-axis direction in FIG. 5) of the cell stack 100. A plurality of thermal barrier assemblies 1300 may be respectively inserted into the plurality of first grooves 1131. In order to fill a gap between the first groove 1131 and the thermal barrier assembly 1300, the first adhesive member 1420a may be disposed to extend along the first groove 1131. The first adhesive member 1420a may evenly spread along a coupling surface of the first groove 1131 and the thermal barrier assembly 1300 to fill a gap between the first groove 1131 and the thermal barrier assembly 1300 compactly.

In addition, as shown in FIG. 6, one surface of the lower cover 1120 facing the cell stack 100 may include a second groove 1121 extending in the length direction (e.g., the Y-axis direction in FIG. 6) of the battery cell 1200, A plurality of second grooves 1121 may be disposed on one surface of the lower cover 1120 and may be spaced apart from each other at predetermined intervals in the stacking direction (e.g., the X-axis direction in FIG. 6) of the cell stack 100. A plurality of thermal barrier assemblies 1300 may be respectively inserted into the plurality of second grooves 1121. To fill a gap between the second groove 1121 and the thermal barrier assembly 1300, the second adhesive member 1410 may be disposed to extend along the second groove 1121. The second adhesive member 1410 may evenly spread along the coupling surface of the second groove 1121 and the thermal barrier assembly 1300 to fill the gap between the second groove 1121 and the thermal barrier assembly 1300 compactly.

In exemplary embodiments, a length of the first groove 1131 or the second groove 1121 may be equal to or greater than a length of the thermal barrier assembly 1300, Here, 'length' may refer to a length in a direction (e.g., the Y-axis direction in FIG. 5 or 6), perpendicular to the stacking direction of the cell stack 100, while being parallel to one surface of the upper cover 1130 or one surface of the lower cover 1120.

In exemplary embodiments, a width of the first groove 1131 or the second groove 1121 may be greater than or equal to a thickness of the thermal barrier assembly 1300. Alternatively, in exemplary embodiments, the width of the first groove 1131 or the second groove 1121 may be equal to or greater than the thickness of the heat-resistant member 1310 included in the thermal barrier assembly 1300. Here, 'width' or 'thickness' may refer to the length of the cell stack 100 in the stacking direction (e.g., the X-axis direction of FIG. 7).

In exemplary embodiments, different portions of the thermal barrier assembly 1300 may be accommodated in the first groove 1131 and the second groove 1121, respectively. For example, as shown in FIG. 7 and FIGS. 8A and 8B, which are partially enlarged views thereof, one end of the thermal barrier assembly 1300 may be accommodated in the first groove 1131, and the other end opposite to the one end may be accommodated in the second groove 1121. In this case, the numbers of first grooves 1131 and second grooves 1121 may be the same.

In exemplary embodiments, the protrusion 1311 of the heat-resistant member 1310 may be accommodated in at least one of the first groove 1131 and the second groove 1121. For example, as shown in FIGS. 8A and 8B, at least a portion of the protrusion 1311 of the heat-resistant member 1310 may be inserted into the first groove 1131 and the second groove 1121. In this case, a gap may be formed between an end portion of the protrusion 1311 of the heat-resistant member 1310 and the first groove 1131 or between the end portion of the protrusion 1311 of the heat-resistant member 1310 and the second groove 1121. The gap may be filled by adhesive members 1410 and 1420.

In exemplary embodiments, the battery module 1000 may further include adhesive members 1410 and 1420 filling a gap between the cell stack 100 and the housing (e.g., 1100 of FIG. 2), For example, as shown in FIG. 7, the battery module 1000 may include a first adhesive member 1420*a* filling a gap between the thermal barrier assembly 1300 and the upper cover 1130, a second adhesive member 1410 filling a gap between the thermal barrier assembly 1300 and the lower cover 1120, and a third adhesive member 1420*b* filling a gap between the cell unit and the upper cover 1130. Here, the first adhesive member 1420*a* and the third adhesive member 1420*b* may correspond to the upper adhesive member 1420 described above with reference to FIG. 2, and the second adhesive member 1410 may correspond to the lower adhesive member 1410 described above with reference to FIG. 2.

In exemplary embodiments, the first adhesive member 1420*a* and the second adhesive member 1410 may be disposed to span the thermal barrier assembly 1300, the first groove 1131, and a portion of the battery cell 1200 adjacent thereto to fill a gap between the thermal barrier assembly 1300 and the first groove 1131. In addition, as shown in portion B of FIG. 7 and FIG. 8B, which is an enlarged view thereof, the second adhesive member 1410 may be disposed to span the thermal barrier assembly 1300, the second groove 1121, and at least a portion of the battery cell 1200 adjacent thereto to fill a gap between the thermal barrier assembly 1300 and the second groove 1121. That is, the first adhesive member 1420*a* and the second adhesive member 1410 may be disposed to fill a gap between the members from the upper cover 1130 and the thermal barrier assembly 1300 to the lower cover 1120. Accordingly, communication between the space on one side of the thermal barrier assembly 1300 and the space on the other side of the thermal barrier assembly 1300 through a gap between the thermal barrier assembly 1300 and the upper cover 1130 may be blocked. Similarly, communication between the space on one side of the thermal barrier assembly 1300 and the space on the other side of the thermal barrier assembly 1300 through a gap between the thermal barrier assembly 1300 and the lower cover 1120 may be blocked. Accordingly, the internal spaces on both sides of the thermal barrier assembly 1300 may be spatially separated from each other.

In exemplary embodiments, the adhesive members 1410 and 1420 may include a third adhesive member 1420*b* filling a gap between a portion of the cell stack 100 in which the thermal barrier assembly 1300 is not disposed and the housing (e.g., 1100 in FIG. 2). For example, as shown in FIG. 7, the third adhesive member 1420*b* may be disposed between at least a portion of the battery cell 1200 and the upper cover 1130.

In exemplary embodiments, the third adhesive member 1420*b* may be disposed between a plurality of first adhesive members 1420*a* adjacent to each other. For example, as shown in FIG. 7, the third adhesive member 1420*b* may be disposed between the first adhesive members 1420*a* disposed to contact each of the thermal barrier assemblies 1300. Accordingly, a space between the two first adhesive members 1420*a* may be partitioned by the third adhesive member 1420*b*.

In exemplary embodiments, the third adhesive member 1420*b* may be disposed parallel to the first adhesive member 1420*a*. For example, as shown in FIG. 5, the third adhesive member 1420*b* and the first adhesive member 1420*a* may each extend in one direction (e.g., the Y-axis direction in FIG. 5), and may be alternately arranged in another direction (e.g., the X-axis direction of FIG. 5) intersecting the one direction.

In exemplary embodiments, the adhesive members 1410 and 1420 may include a thermally conductive material (e.g., the thermally conductive adhesive described above with reference to FIGS. 1 and 2), and thus, the adhesive members 1410 and 1420 may function as a heat passage through which thermal energy of the battery cell 1200 or the thermal barrier assembly 1300 is released to the outside of the battery module 1000. That is, high-temperature thermal energy inside the battery cell 1200 and the thermal barrier assembly 1300 may be released to the housing (e.g., 1100 in FIG. 2) or a heat sink (not shown) through the adhesive members 1410 and 1420.

In addition, the adhesive members 1410 and 1420 may fill the gap between the cell stack 100 and the housing (e.g., 1100 in FIG. 2) to prevent high-temperature thermal energy or flames, or scattering materials (combustion particles) occurring in any one battery cell 1200 from being propagated to other adjacent battery cells 1200. In particular, the first adhesive member 1420*a* and the second adhesive member 1410 may be disposed to fill a gap between the thermal barrier assembly 1300 and the housing (e.g., 1100 in FIG. 2), and thus, high-temperature thermal energy, flames, or scattering materials (particles) occurring in the battery cell 1200 on one side of the thermal barrier assembly 1300 may be prevented from being propagated to the battery cell 1200 on the other side of the thermal barrier assembly 1300. In exemplary embodiments, the third adhesive member 1420*b* may be disposed between the battery cell 1200 and the upper cover 1130 to further limit a propagation range of heat energy, flames, or particles. For example, as shown in FIG. 9, a distribution of combustion particles generated due to thermal runaway of one battery cell 1200 may be confined to a space between the first adhesive member 1420*a* and the third adhesive member 1420*b* and extensively spreading of the combustion particles to other portions of the cell stack 100 may be prevented.

The thermal barrier assembly 1300 and the adhesive members 1410 and 1420 disposed between the thermal barrier assembly 1300 and the housing (e.g., 1100 in FIG. 2) according to exemplary embodiments may prevent thermal runaway of any one battery cell 1200 from being transferred to another battery cell 1200, and chain ignition of the cell stack 100 may be prevented in advance.

In the above description, the exemplary embodiments have been described as a configuration applied to a battery module, but the cell stack, the thermal barrier assembly, and the adhesive member according to the exemplary embodiments are not limitedly applied to the battery module. That is, all of the exemplary embodiments described above may be equally applied to a battery pack including one or more battery cells. For example, one or more cell stacks may be accommodated in the internal space of the pack housing of the battery pack, and a thermal barrier assembly included in the cell stack may be arranged to partition the internal space of the pack housing into a plurality of sub-spaces. The thermal barrier assembly may prevent high-temperature thermal energy or combustion particles from propagating between a plurality of battery cells accommodated inside the pack housing. In addition, one or more adhesive members filling at least some of the spaces between the cell stack and the pack housing may be disposed. In particular, at least some of the adhesive members may fill the gap between the thermal barrier assembly and the pack housing to separate one side space and the other side space of the thermal barrier assembly, thereby reliably blocking propagation of high-temperature thermal energy, flames, or combustion particles between battery cells.

The battery pack with high safety according to exemplary embodiments may be provided.

The battery module and battery pack according to exemplary embodiments may prevent thermal energy, flames, or conductive particles occurring due to thermal runaway or ignition of a specific battery cell from propagating to other adjacent battery cells.

In addition, the battery module and the battery pack according to the exemplary embodiments may prevent battery cells accommodated therein from being ignited or exploded in series.

While exemplary embodiments have been shown and described above, it will be apparent to those skilled in the art that modifications and variations could be made without departing from the scope of the present disclosure as defined by the appended claims.

What is claimed is:

1. A battery module comprising:
   a housing having an internal space;
   a cell stack disposed in the internal space and including a plurality of battery cells stacked in a first direction and one or more thermal barrier assemblies; and
   an adhesive member disposed between the cell stack and the housing,
   wherein at least one edge of the one or more thermal barrier assemblies comprises a protrusion inserted into a groove in the housing in a second direction perpendicular to the first direction, and
   wherein at least a portion of the adhesive member is disposed in the groove and fills a gap between the groove and the protrusion.

2. The battery module of claim 1, wherein the adhesive member includes a thermally conductive adhesive.

3. The battery module of claim 1, wherein
   at least one of the one or more thermal barrier assemblies includes:
   a heat-resistant member preventing heat propagation between adjacent battery cells; and
   a compression member facing the heat-resistant member, and
   wherein at least one edge of the heat-resistant member is inserted into the housing.

4. The battery module of claim 3, wherein the heat-resistant member includes mica, ceramic wool, or aerogel, or a combination of two or more of mica, ceramic wool, and aerogel.

5. The battery module of claim 3, wherein
   one surface of the compression member faces one surface of the heat-resistant member, and
   an area of the one surface of the compression member is smaller than or equal to an area of the one surface of the heat-resistant member.

6. The battery module of claim 5, wherein one or more compression members are disposed on the one surface and the other side opposite to the one surface of the heat-resistant member, respectively.

7. The battery module of claim 3, wherein the thermal barrier assembly further includes a fixing member disposed on at least one side of the compression member.

8. The battery module of claim 7, wherein the heat-resistant member and the compression member are fixed to each other via the fixing member.

9. The battery module of claim 7, wherein at least one of the plurality of battery cells and the thermal barrier assembly are fixed to each other via the fixing member.

10. The battery module of claim 3, wherein
    the housing includes a first cover facing one surface of the cell stack and a second cover facing the other surface of the cell stack, and
    the adhesive member includes a first adhesive member disposed between the cell stack and the first cover and a second adhesive member disposed between the cell stack and the second cover.

11. The battery module of claim 10, wherein an area in which the second adhesive member contacts the second cover is larger than an area in which the first adhesive member contacts the first cover.

12. The battery module of claim 11, wherein the second adhesive member continuously contacts the second cover in the first direction.

13. The battery module of claim 10, wherein
    the heat-resistant member includes a protrusion protruding more in a second direction than the plurality of battery cells, and
    the second direction is a direction in which the first cover and the second cover face each other.

14. The battery module of claim 13, wherein at least one of the first cover and the second cover includes the groove in which at least a portion of the protrusion is accommodated.

15. The battery module of claim 14, wherein
    an end portion of the protrusion and the groove are spaced apart from each other in the second direction, and
    at least a portion of the adhesive member fills a gap between the end portion of the protrusion and the groove.

16. A battery module comprising:
    a housing;
    a thermal barrier assembly partition internal space of the housing;
    a plurality of battery cells disposed in the internal space and stacked in a first direction; and
    an adhesive member disposed between the thermal barrier assembly and the housing,
    wherein the thermal barrier assembly includes a protrusion protruding further than the plurality of battery cells in a second direction perpendicular to the first direction and inserted into a groove in the housing in the second direction, and
    wherein at least a portion of the adhesive member is disposed in the groove and fills a gap between the groove and the protrusion.

17. The battery module of claim 16, wherein the adhesive member includes a thermally conductive adhesive and fixes the thermal barrier assembly to the groove.

18. The battery module of claim 16, wherein the width of the groove is greater than or equal to the thickness of the thermal barrier assembly.

19. The battery module of claim 1, wherein the width of the groove is greater than or equal to the thickness of the thermal barrier assembly.

* * * * *